(12) United States Patent
Yamamoto et al.

(10) Patent No.: US 12,017,579 B2
(45) Date of Patent: Jun. 25, 2024

(54) WORK SITE MANAGEMENT SYSTEM AND WORK SITE MANAGEMENT METHOD

(71) Applicant: Komatsu Ltd., Tokyo (JP)

(72) Inventors: Takashi Yamamoto, Tokyo (JP); Takashi Hiranaka, Tokyo (JP); Kenta Osagawa, Tokyo (JP)

(73) Assignee: Komatsu Ltd., Tokyo (JP)

( * ) Notice: Subject to any disclaimer, the term of this patent is extended or adjusted under 35 U.S.C. 154(b) by 316 days.

(21) Appl. No.: 17/431,500

(22) PCT Filed: Mar. 19, 2020

(86) PCT No.: PCT/JP2020/012276
§ 371 (c)(1),
(2) Date: Aug. 17, 2021

(87) PCT Pub. No.: WO2020/189758
PCT Pub. Date: Sep. 24, 2020

(65) Prior Publication Data
US 2022/0144163 A1    May 12, 2022

(30) Foreign Application Priority Data

Mar. 20, 2019 (JP) ................................. 2019-053885

(51) Int. Cl.
*B60Q 1/34*      (2006.01)
*B60Q 1/38*      (2006.01)
*G01C 21/34*    (2006.01)

(52) U.S. Cl.
CPC ............. *B60Q 1/346* (2013.01); *B60Q 1/381* (2022.05); *G01C 21/3407* (2013.01)

(58) Field of Classification Search
CPC .................................................. G01C 21/3407
See application file for complete search history.

(56) References Cited

U.S. PATENT DOCUMENTS

| | | | |
|---|---|---|---|
| 10,417,904 B2 | 9/2019 | Madigan et al. | |
| 10,571,911 B2 | 2/2020 | Prokhorov | |
| 10,889,295 B2 | 1/2021 | Paris et al. | |
| 2017/0174123 A1 | 6/2017 | Ogihara et al. | |

(Continued)

FOREIGN PATENT DOCUMENTS

| | | |
|---|---|---|
| JP | 2017-109705 A | 6/2017 |
| JP | 2017-182537 A | 10/2017 |

(Continued)

OTHER PUBLICATIONS

Office Action dated Jan. 19, 2023, issued in the corresponding Canadian patent application No. 3131078.

(Continued)

*Primary Examiner* — Jaime Figueroa
*Assistant Examiner* — Jerrod Irvin Davis
(74) *Attorney, Agent, or Firm* — Locke Lord LLP

(57) ABSTRACT

A work site management system includes: a travel course data acquisition unit that acquires travel course data of an unmanned vehicle which includes course type data indicating a type of an intersection at a work site where the unmanned vehicle travels; and a turn signal control unit that determines whether to normally operate or non-normally operate a direction indicator of the unmanned vehicle based on the course type data.

3 Claims, 8 Drawing Sheets

(56) References Cited

U.S. PATENT DOCUMENTS

| | | |
|---|---|---|
| 2018/0354412 A1 | 12/2018 | Ogihara et al. |
| 2019/0366914 A1* | 12/2019 | Ochida .................... B60Q 1/44 |
| 2020/0293062 A1 | 9/2020 | Ogihara et al. |
| 2021/0163013 A1* | 6/2021 | Ueno ................ B60W 60/0017 |

FOREIGN PATENT DOCUMENTS

| | | |
|---|---|---|
| WO | 2016/093372 A1 | 6/2016 |
| WO | 2018044785 A1 | 3/2018 |
| WO | 2018/134901 A1 | 7/2018 |

OTHER PUBLICATIONS

Office Action dated Aug. 11, 2022, issued for the corresponding Australian patent application No. 2020242002.

* cited by examiner

WORK SITE MANAGEMENT SYSTEM AND WORK SITE MANAGEMENT METHOD

FIELD

The present disclosure relates to a work site management system and a work site management method.

BACKGROUND

In a work site in a wide area such as a mine, an unmanned vehicle with a direction indicator operates in some cases.

CITATION LIST

Patent Literature

Patent Literature 1: International Publication No. 2016/093372

SUMMARY

Technical Problem

There is a case where both unmanned vehicle and manned vehicle operate at the work site. As the direction indicator of the unmanned vehicle operates at an intersection, a driver of the manned vehicle can grasp a running direction of the unmanned vehicle. The intersection between travel paths at the work site is vast. In addition, a shape of the intersection between the travel paths at the work site is likely to be complicated. Therefore, depending on a situation at the intersection, there is a possibility that the driver of the manned vehicle fails to fully grasp the running direction of the unmanned vehicle and becomes confused even if the direction indicator of the unmanned vehicle operates.

Solution to Problem

According to an aspect of the present invention, a work site management system comprises: a travel course data acquisition unit that acquires travel course data of an unmanned vehicle which includes course type data indicating a type of an intersection at a work site where the unmanned vehicle travels; and a turn signal control unit that determines whether to normally operate or non-normally operate a direction indicator of the unmanned vehicle based on the course type data.

Advantageous Effects of Invention

According to an aspect of the present invention, a driver of a manned vehicle can grasp a running direction of an unmanned vehicle.

DESCRIPTION OF EMBODIMENTS

Hereinafter, an embodiment of the present disclosure will be described with reference to the drawings, but the present invention is not limited thereto. Components of the embodiment to be described below can be combined as appropriate. In addition, there is also a case where some components are not used.

[Management System]

Figure 1:
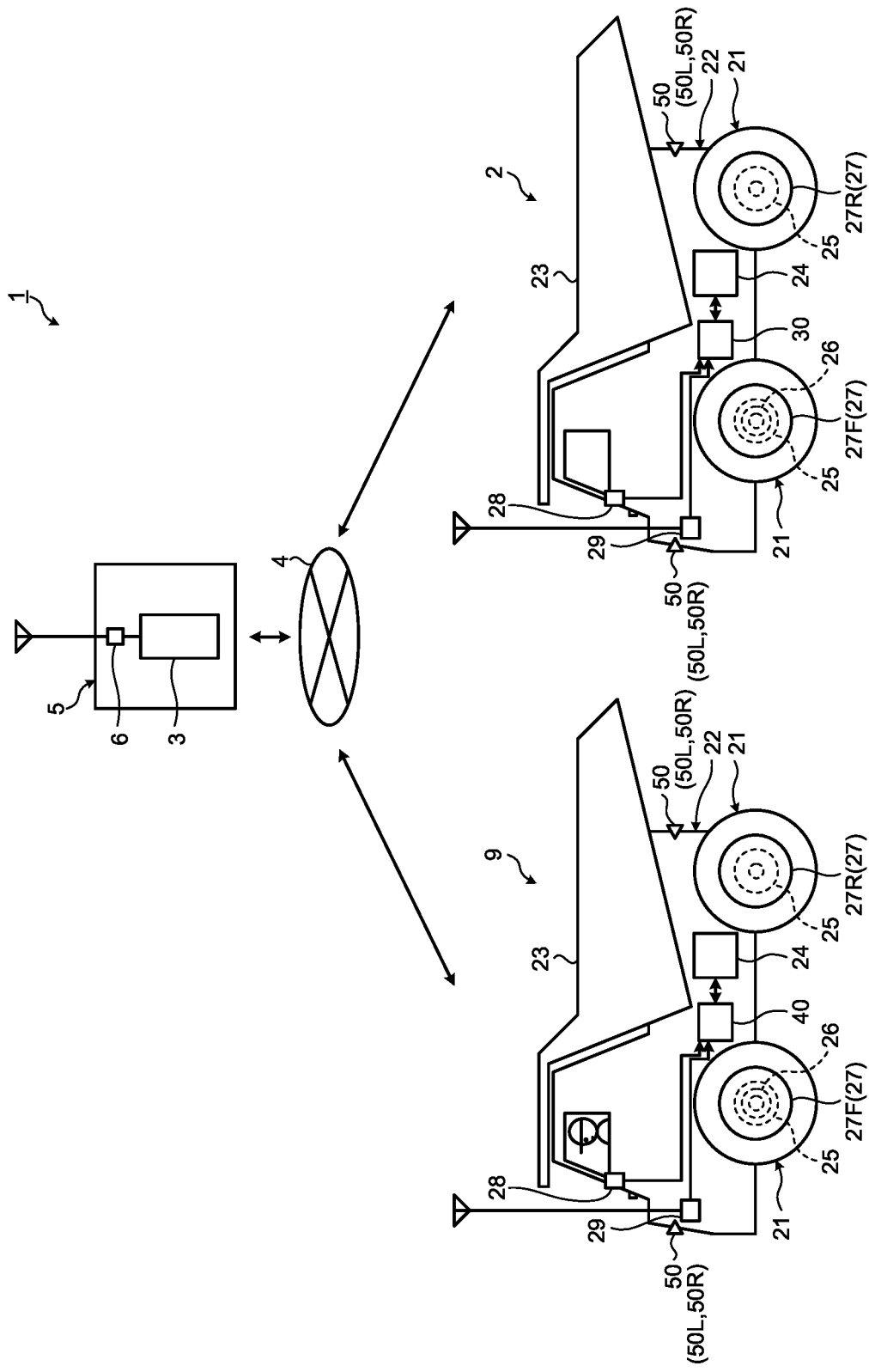
FIG. 1 is a view schematically illustrating examples of a management system, an unmanned vehicle, and a manned vehicle according to the present embodiment.

FIG. 1 is a diagram schematically illustrating examples of a management system 1, an unmanned vehicle 2, and a manned vehicle 9 according to the present embodiment. Each of the unmanned vehicle 2 and the manned vehicle 9 operates at a work site. In the present embodiment, the work site is a mine or a quarry. The mine refers to a place or a business site where a mineral is mined.

The unmanned vehicle 2 refers to a vehicle that operates in an unmanned manner without any driving operation performed by a driver. The manned vehicle 9 refers to a vehicle that operates with the driver's driving operation.

The unmanned vehicle 2 and the manned vehicle 9 are dump trucks which are a kind of transport vehicle that travels at the work site and transports a cargo. As the cargo transported by the unmanned vehicle 2 and the manned vehicle 9, ore or dirt excavated in the mine or the quarry is exemplified.

Note that the work site is not limited to the mine or the quarry. The work site may be any work site where the transport vehicle carries the cargo.

The management system 1 includes a management device 3 and a communication system 4. The management device 3 includes a computer system and is installed in a control facility 5 at the work site, for example. The communication system 4 performs communication among the management device 3, the unmanned vehicle 2, and the manned vehicle 9. The management device 3 is connected with a wireless communication device 6. The communication system 4 includes the wireless communication device 6. The management device 3, the unmanned vehicle 2, and the manned vehicle 9 wirelessly communicate with each other via the communication system 4.

[Unmanned Vehicle]

The unmanned vehicle 2 travels at the work site based on travel course data transmitted from the management device 3. The unmanned vehicle 2 includes a traveling device 21, a vehicle main body 22 supported by the traveling device 21, a dump body 23 supported by the vehicle main body 22, a direction indicator 50, a control device 30, a position detection device 28, and a wireless communication device 29.

The traveling device 21 includes a drive device 24 that drives the traveling device 21, a brake device 25 that brakes the traveling device 21, a steering device 26 that adjusts a traveling direction, and wheels 27.

The unmanned vehicle 2 travels autonomously as the wheels 27 rotate. The wheels 27 include front wheels 27F and rear wheels 27R. Tires are mounted on the wheels 27.

The drive device 24 generates a driving force for accelerating the unmanned vehicle 2. The drive device 24 includes an internal combustion engine such as a diesel engine. Note that the drive device 24 may include an electric motor. Power generated by the drive device 24 is transmitted to the rear wheels 27R. The brake device 25 generates a braking force for decelerating or stopping the unmanned vehicle 2. The steering device 26 can adjust the traveling direction of the unmanned vehicle 2. The traveling direction of the unmanned vehicle 2 includes a direction of a front portion of the vehicle main body 22. The steering device 26 adjusts the traveling direction of the unmanned vehicle 2 by steering the front wheels 27F.

The direction indicator 50 displays the running direction of the unmanned vehicle 2. The direction indicator 50 is disposed at each of the front portion and a rear portion of the vehicle main body 22. The direction indicator 50 includes a turn signal lamp and notifies a running direction of the unmanned vehicle 2 by causing the turn signal lamp to light or blink. The direction indicator 50 includes a left turn signal lamp 50L that lights or blinks when the unmanned vehicle 2 turns left, and a right turn signal lamp 50R that lights or blinks when the unmanned vehicle 2 turns right. The left turn signal lamp 50L is disposed in a left portion of the vehicle main body 22, and the right turn signal lamp 50R is disposed in a right portion of the vehicle main body 22. The left turn signal lamp 50L is disposed at each of a front portion and a rear portion of the left portion of the vehicle main body 22. The left turn signal lamps 50L disposed at the front portion and the rear portion of the vehicle main body 22 light or blink in synchronization with each other. The right turn signal lamp 50R is disposed at each of a front portion and a rear portion of the right portion of the vehicle main body 22. The right turn signal lamps 50R disposed at the front portion and the rear portion of the vehicle main body 22 light or blink in synchronization with each other.

The control device 30 can communicate with the management device 3 present outside the unmanned vehicle 2 by, for example, the wireless communication device 29. The control device 30 outputs an accelerator command for operating the drive device 24, a brake command for operating the brake device 25, and a steering command for operating the steering device 26. The drive device 24 generates a driving force for accelerating the unmanned vehicle 2 based on the accelerator command output from the control device 30. As the output of the drive device 24 is adjusted, the travel speed of the unmanned vehicle 2 is adjusted. The brake device 25 generates a braking force for decelerating the unmanned vehicle 2 based on the brake command output from the control device 30. The steering device 26 generates a force for changing a direction of the front wheels 27F so as to make the unmanned vehicle 2 travel straight or swing based on the steering command output from the control device 30.

The position detection device 28 detects a position of the unmanned vehicle 2. The position of the unmanned vehicle 2 is detected using a global navigation satellite system (GNSS). The global navigation satellite system includes a global positioning system (GPS). The global navigation satellite system detects an absolute position of the unmanned vehicle 2 specified by coordinate data of the latitude, longitude, and altitude. The position of the unmanned vehicle 2 specified in a global coordinate system is detected by the global navigation satellite system. The global coordinate system is a coordinate system fixed to the earth. The position detection device 28 includes a GNSS receiver and detects the absolute position (coordinates) of the unmanned vehicle 2.

The wireless communication device 29 performs wireless communication. The communication system 4 includes the wireless communication device 29. The wireless communication device 29 can wirelessly communicate with the management device 3.

[Manned Vehicle]

The manned vehicle 9 travels at the work site based on the driving operation of the driver riding in a driver's cab of the manned vehicle 9. The manned vehicle 9 includes the traveling device 21, the vehicle main body 22, the dump body 23, the drive device 24, the brake device 25, the steering device 26, the wheels 27 including the front wheels 27F and the rear wheels 27R, the position detection device 28, the wireless communication device 29, the direction indicator 50, and a control device 40.

The control device 40 can communicate with the management device 3 present outside the manned vehicle 9 by, for example, the wireless communication device 29. An accelerator pedal for operating the drive device 24, a brake pedal for operating the brake device 25, and a steering wheel for operating the steering device 26 are disposed in the driver's cab. The accelerator pedal, the brake pedal, and the steering wheel are operated by the driver. The drive device 24 generates a driving force for accelerating the manned vehicle 9 based on the amount of operation of the accelerator pedal. As the output of the drive device 24 is adjusted, the travel speed of the manned vehicle 9 is adjusted. The brake device 25 generates a braking force for decelerating the manned vehicle 9 based on the amount of operation of the brake pedal. The steering device 26 generates a force for changing a direction of the front wheels 27F in order to cause the manned vehicle 9 to move straight or swing based on the amount of operation of the steering wheel.

[Work Site]

Figure 2:
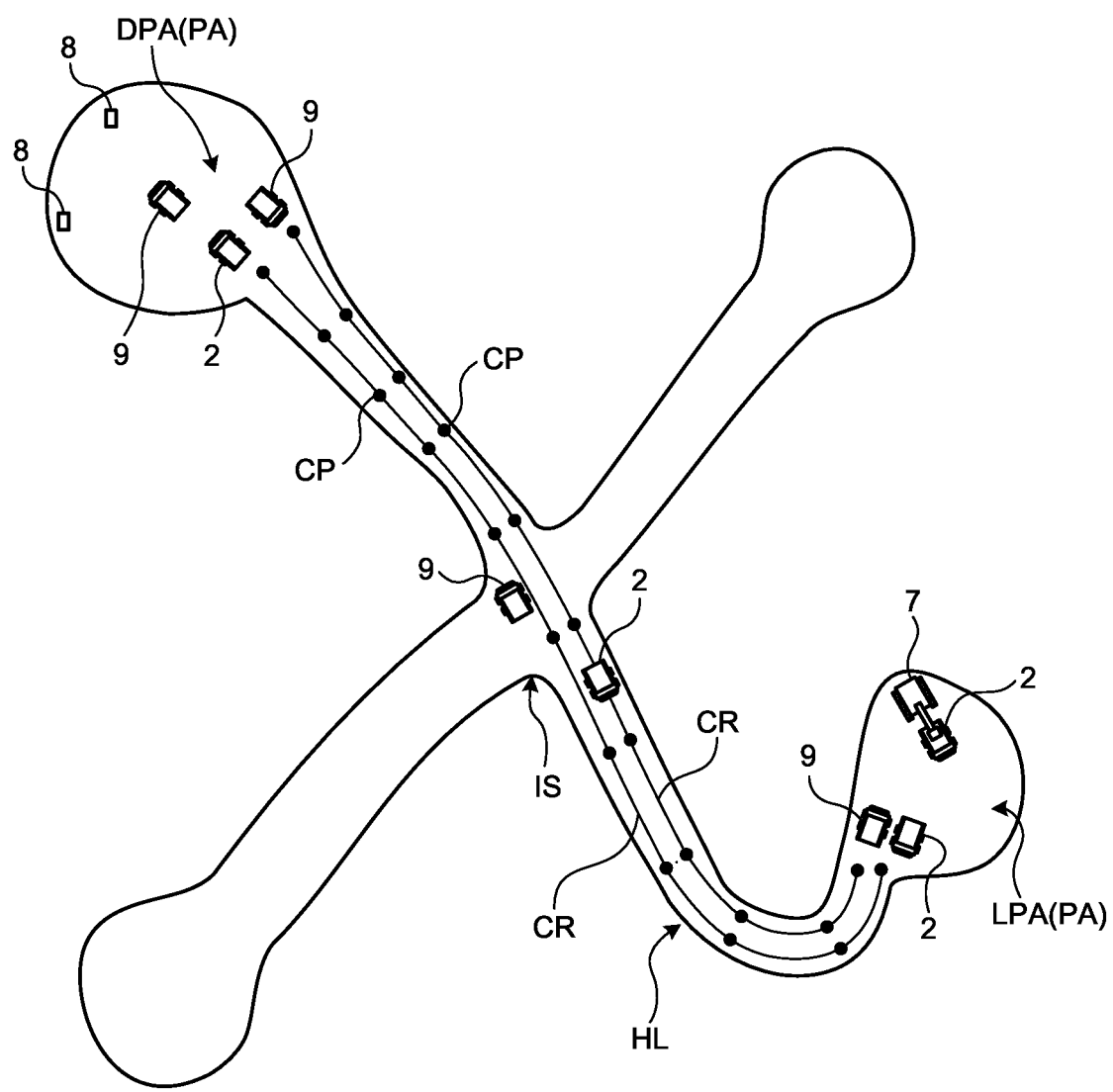
FIG. 2 is a view schematically illustrating an example of a work site according to the present embodiment.

FIG. 2 is a view schematically illustrating an example of the work site according to the present embodiment. The unmanned vehicle 2 and the manned vehicle 9 travel on at least a part of a work site PA of a mine and a travel path HL leading to the work site PA. The work site PA includes at least one of a loading site LPA and a discharging site DPA. The travel path HL includes an intersection IS.

The loading site LPA refers to an area where loading work for loading the cargo on the unmanned vehicle 2 and the manned vehicle 9 is performed. A loader 7 operates at the loading site LPA. The loader 7 is, for example, an excavator or a rope excavator having working equipment. The discharging site DPA refers to an area where discharging work for discharging the cargo from the unmanned vehicle 2 and the manned vehicle 9 is performed. For example, a crusher 8 is provided at the discharging site DPA.

The unmanned vehicle 2 travels at the work site based on the travel course data indicating a travel condition of the unmanned vehicle 2. As illustrated in FIG. 2, the travel course data includes a plurality of course points CP set at intervals. The course point CP defines a target position of the unmanned vehicle 2. The target position of the unmanned vehicle 2 includes target coordinates defined by the latitude, longitude, and altitude. A target travel speed and a target travel direction of the unmanned vehicle 2 are set for each of the plurality of course points CP. In addition, the travel course data includes a travel course CR indicating a target travel route of the unmanned vehicle 2. The travel course CR is defined by a line connecting the plurality of course points CP.

In the present embodiment, turn signal data that defines an operating condition of the direction indicator 50 of the unmanned vehicle 2 and course type data indicating a course type of the travel course data are set for each of the plurality of course points CP. The course type data indicates whether or not the course point CP is set at the intersection IS. In addition, the course type data indicates a type of the intersection IS where the course point CP is set. Examples of the type of the intersection IS include a width of the travel path HL at the intersection IS, a bending angle of the intersection IS, and the number of branches of the travel path HL at the intersection IS.

The travel course CR is set in the travel path HL and the work site PA. The unmanned vehicle 2 travels on the travel path HL according to the travel course CR.

The travel course data is generated in the management device 3. The management device 3 transmits the generated travel course data to the control device 30 of the unmanned vehicle 2 via the communication system 4. The control device 30 controls the traveling device 21 such that the unmanned vehicle 2 travels along the travel course CR based on the travel course data and travels according to the target travel speed and the target travel direction set for each of the plurality of course points CP. In addition, the control device 30 controls the direction indicator 50 based on the turn signal data and the course type data set in each of the plurality of course points CP.

In the present embodiment, the unmanned vehicle 2 and the manned vehicle 9 operate in a mixed manner at the work site. Both the unmanned vehicle 2 and the manned vehicle 9 travel in the travel path HL and the work site PA. For example, when shifting from a work site where only the manned vehicle 9 operates as a transport vehicle to a work site where only the unmanned vehicle 2 operates, both the unmanned vehicle 2 and manned vehicle 9 operate at a work site during the shift period.

[Management Device and Control Device]

Figure 3:
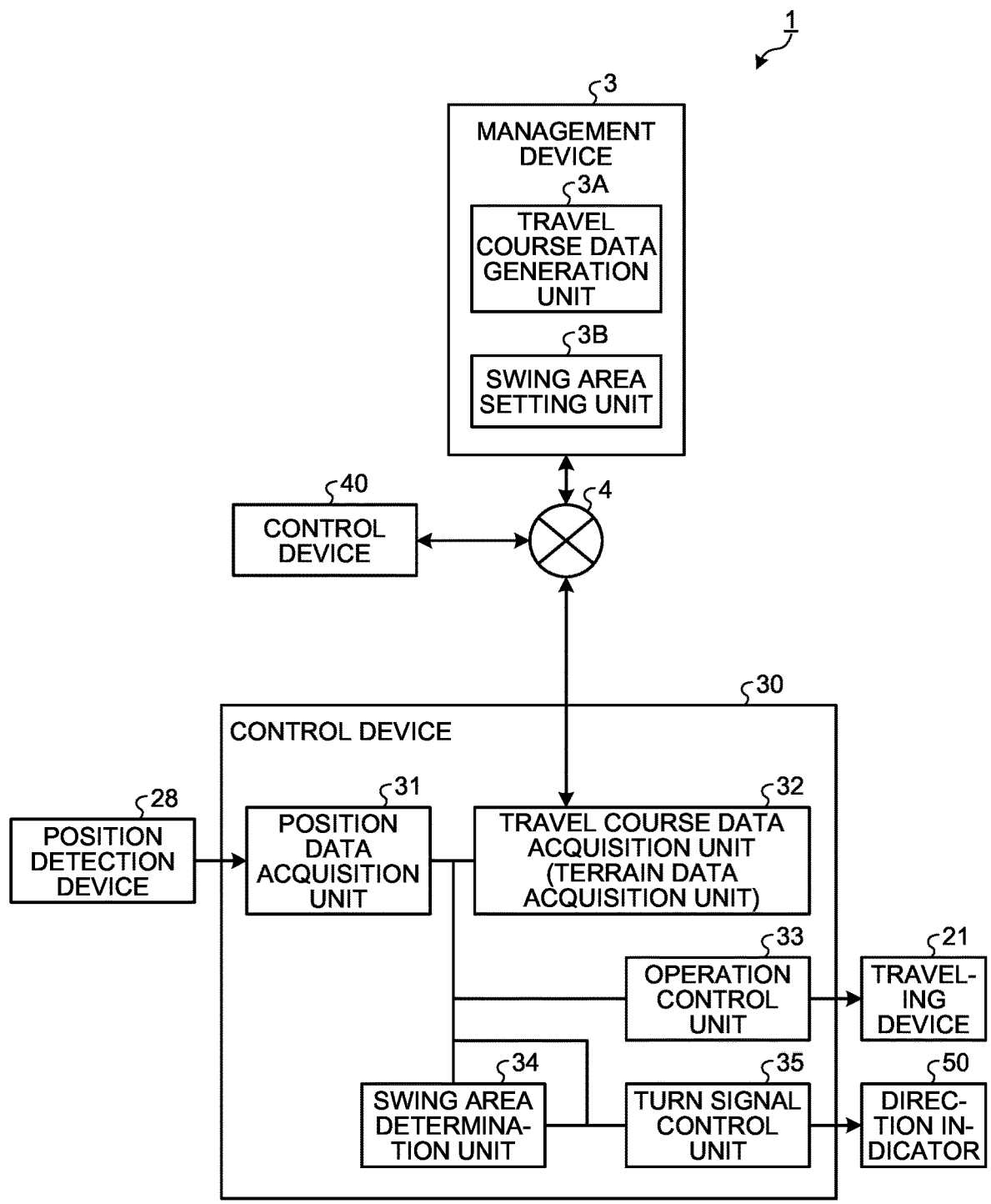
FIG. 3 is a functional block diagram illustrating an example of the management system according to the present embodiment.

FIG. 3 is a functional block diagram illustrating an example of the management system 1 according to the present embodiment.

The management device 3 has a travel course data generation unit 3A and a swing area setting unit 3B.

The travel course data generation unit 3A generates the travel course data. As described above, the travel course data includes the plurality of course points CP that define the target position of the unmanned vehicle 2. The travel course CR is defined by the plurality of course points CP. The target travel speed, the target travel direction, the turn signal data, and the course type data of the unmanned vehicle 2 are set for each of the plurality of course points CP.

The swing area setting unit 3B sets a swing area, which indicates an area where the unmanned vehicle 2 swings, at a work site. The swing refers to a course change of the unmanned vehicle 2. The swing area is set, for example, in the travel path HL or the intersection IS.

Note that the swing area may be set by an administrator who can operate the management device 3.

The control device 30 includes a position data acquisition unit 31, a terrain data acquisition unit 32, an operation control unit 33, a swing area determination unit 34, and a turn signal control unit 35.

The position data acquisition unit 31 acquires detection data of the position detection device 28 of the unmanned vehicle 2. The detection data of the position detection device 28 indicates position data of the unmanned vehicle 2.

The terrain data acquisition unit 32 acquires terrain data of the work site where the unmanned vehicle 2 travels. The terrain data includes the travel course data of the unmanned vehicle 2. The terrain data acquisition unit 32 includes a travel course data acquisition unit that acquires the travel course data of the unmanned vehicle 2. As described above, the travel course data is defined by the plurality of course points CP. The course point CP includes target coordinates of the unmanned vehicle 2 defined by the latitude, longitude, and altitude. The terrain of the work site where the unmanned vehicle 2 travels is defined by the plurality of course points CP. In the following description, the terrain data acquisition unit 32 is appropriately referred to as the travel course data acquisition unit 32.

The travel course data acquisition unit 32 acquires the travel course data of the unmanned vehicle 2 transmitted from the travel course data generation unit 3A. In addition, the travel course data acquisition unit 32 acquires the swing area of the unmanned vehicle 2 transmitted from the swing area setting unit 3B.

The operation control unit 33 controls traveling of the unmanned vehicle 2 based on the position data and the travel course data of the unmanned vehicle 2. The operation control unit 33 controls the traveling device 21 such that the unmanned vehicle 2 travels according to the travel course data based on the position data of the unmanned vehicle 2.

The swing area determination unit 34 determines whether the unmanned vehicle 2 exists in the swing area based on the position data and the travel course data of the unmanned vehicle 2.

The turn signal control unit 35 controls the direction indicator 50 based on the travel course data. In the present embodiment, the turn signal control unit 35 determines whether to normally operate or non-normally operate the direction indicator 50 based on the travel course data. The turn signal control unit 35 determines whether to normally operate or non-normally operate the direction indicator 50 based on the course type of the travel course data.

The turn signal control unit 35 outputs a first command for normally operating the direction indicator 50 of the unmanned vehicle 2 in the swing area when the travel course data is a first course type, and outputs a second command different from the first command in the swing area when the travel course data is a second course type.

The normal operation of the direction indicator 50 refers to causing only the left turn signal lamp 50L to light or blink and causing only the right turn signal lamp 50R to light or blink between the left turn signal lamp 50L and the right turn signal lamp 50R of the direction indicator 50.

The non-normal operation of the direction indicator 50 refers to causing both the left turn signal lamp 50L and the right turn signal lamp 50R of the direction indicator 50 to light or blink.

In the following description, lighting or blinking of only the left turn signal lamp 50L is appropriately referred to as left turn lighting, and lighting or blinking of only the right turn signal lamp 50R is appropriately referred to as right turn lighting. In addition, lighting or blinking of both the left turn signal lamp 50L and the right turn signal lamp 50R is appropriately referred to as hazard lighting.

The first command includes a left turn lighting command or a right turn lighting command that normally operates the direction indicator 50. The second command includes a hazard command for the hazard lighting of the direction indicator 50.

Figure 4:
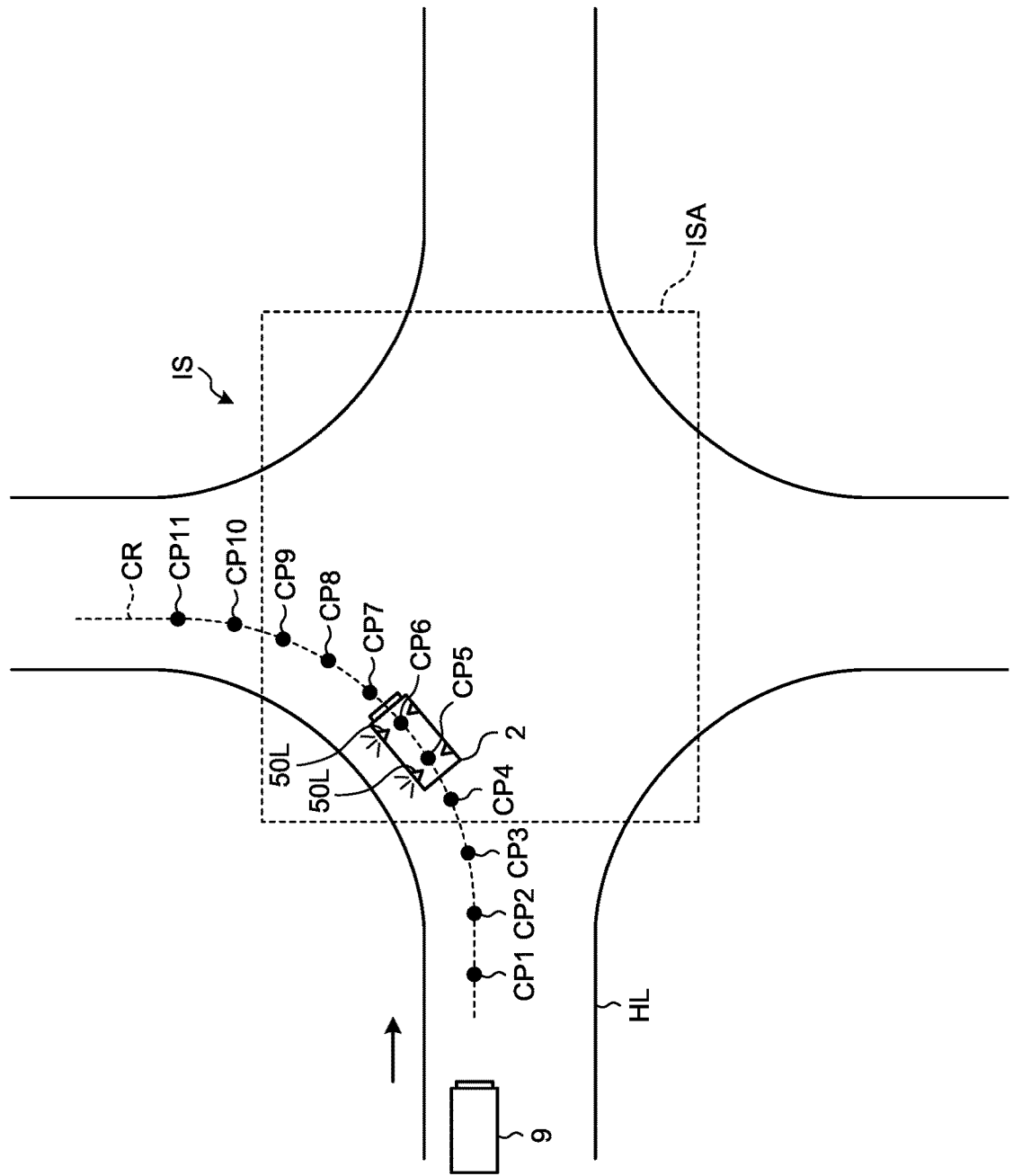
FIG. 4 is a view schematically illustrating an example of a swing area according to the present embodiment.

[Operation in Swing Area] FIG. 4 is a view schematically illustrating an example of a swing area ISA according to the present embodiment. FIG. 4 illustrates the intersection IS of the first course type. As illustrated in FIG. 4, the swing area ISA is set at the intersection IS. The swing area ISA is set at the intersection IS and is an area where the unmanned vehicle 2 swings. In addition, the plurality of course points CP are set in the travel path HL and the intersection IS based on the travel course data.

The course point CP includes the course type data indicating whether the course point CP is set at the intersection IS. In the example illustrated in FIG. 4, course points CP1, CP2, CP3, CP10, and CP11 are located outside the swing area ISA. Therefore, the course points CP1, CP2, CP3, CP10, and CP11 include course type data indicating that they are not set at the intersection IS. Course points CP4, CP5, CP6, CP7, CP8, and CP9 are located inside an intersection area ISA. Therefore, the course points CP4, CP5, CP6, CP7, CP8, and CP9 include course type data indicating that they are set at the intersection IS.

Note that the course points CP1, CP2, CP3, CP10, and CP11 do not necessarily include the course type data indicating that they are not set at the intersection IS. It suffices that the course point CP set inside the intersection ISA and the course point CP set outside the intersection IS can be distinguished.

In addition, the course point CP includes course type data indicating a type of the intersection IS in which the course point CP is set. In the example illustrated in FIG. 4, the course points CP4, CP5, CP6, CP7, CP8, and CP9 include course type data indicating that the travel course data is the first course type.

Note that the course type data is not necessarily set at the course point CP. The course type data may be set in the swing area ISA.

In the present embodiment, the first course type is, for example, a course type in which the bending angle of the intersection IS is substantially 90 degrees and the number of branches of the travel path HL at the intersection IS is four. Note that the first course type illustrated in FIG. 4 is an example. It suffices that the first course type is a course type that enables the driver of the manned vehicle 9 or the operator existing around the unmanned vehicle 2 to clearly recognize the running direction of the right turn or left turn at the intersection IS by blinking of the direction indicator 50. The course type data is arbitrarily set by the administrator of the management device 3.

In addition, the course point CP includes the turn signal data that defines the operating condition of the direction indicator 50 of the unmanned vehicle 2. When the intersection IS is the first course type, the course point CP includes the turn signal data for normally operating the direction indicator 50.

The course point CP includes the course type and the target travel direction. That is, whether the course type is the first course type or the second course type is defined by the course point CP. In addition, the target travel direction of the unmanned vehicle 2 is defined by the course point CP.

When the intersection IS is the first course type, the turn signal control unit 35 outputs the first command for normally operating the direction indicator 50 of the unmanned vehicle 2 in the swing area ISA based on the turn signal data. That is, when the unmanned vehicle 2 turns left at the intersection IS in the case where the intersection IS is the first course type, the turn signal control unit 35 turns on only the left turn signal lamp 50L of the direction indicator 50 for a left turn based on a target direction direction included in the course point CP as illustrated in FIG. 4. Note that the turn signal control unit 35 turns on only the right turn signal lamp 50R of the direction indicator 50 for a right turn based on a target direction direction included in the course point CP when the unmanned vehicle 2 turns right in the case where the intersection IS is the first course type.

Figure 5:
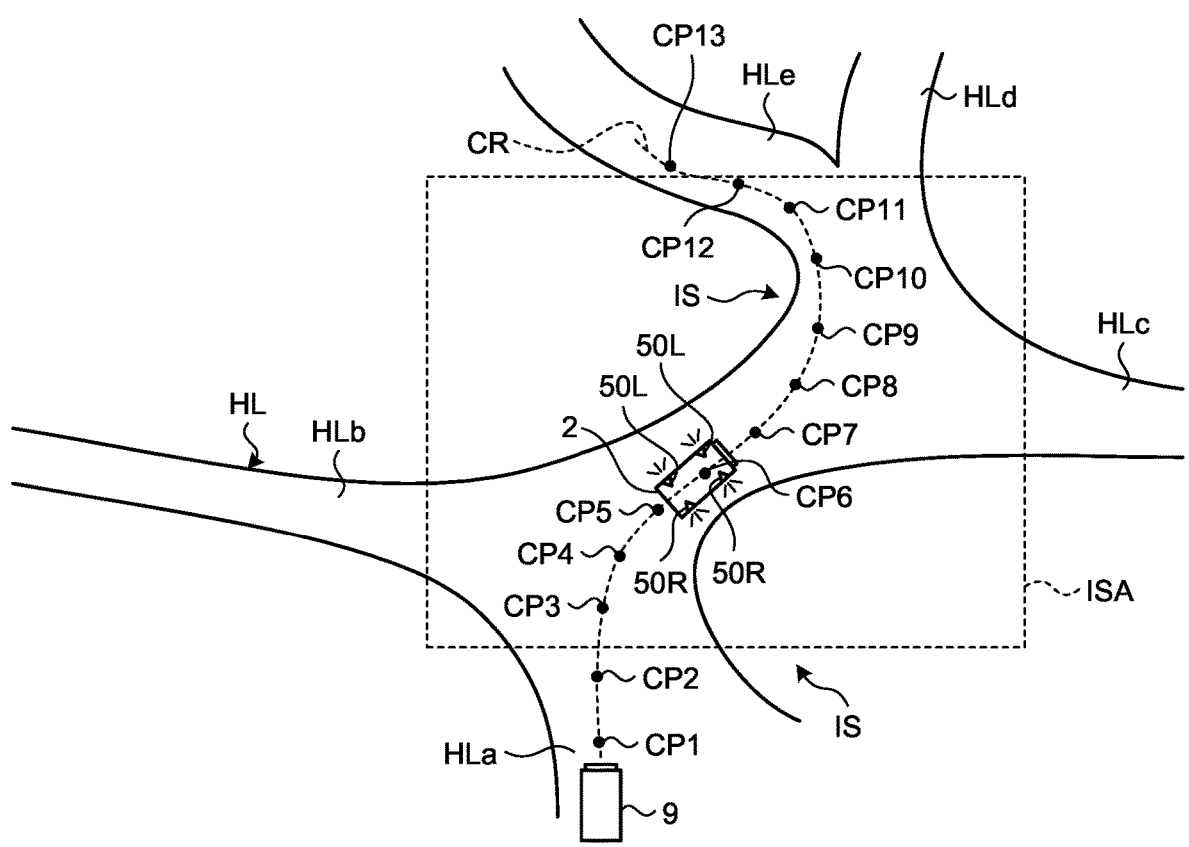
FIG. 5 is a view schematically illustrating an example of the swing area according to the present embodiment.

FIG. 5 is a view schematically illustrating an example of the swing area according to the present embodiment. FIG. 5 illustrates the intersection IS of the second course type. The swing area ISA is set at the intersection IS. In addition, the plurality of course points CP are set in the travel path HL based on the travel course data.

In the example illustrated in FIG. 5, the course points CP1, CP2, and CP13 are located outside the swing area ISA. Therefore, the course points CP1, CP2, and CP13 include course type data indicating that they are not set at the intersection IS. The course points CP3, CP4, CP5, CP6, CP7, CP8, CP9, CP10, CP11, and CP12 are located inside an intersection area ISA. Therefore, the course points CP3, CP4, CP5, CP6, CP7, CP8, CP9, CP10, CP11, and CP12 include course type data indicating that they are set at the intersection IS.

The course points CP3, CP4, CP5, CP6, CP7, CP8, CP9, CP10, CP11, and CP12 include course type data indicating that the travel course data is the second course type.

In the present embodiment, the second course type is, for example, a type in which the width of the travel path HL at the intersection IS is irregular and the bending angle of the intersection IS is small. The second course type is, for example, a course type in which the intersection IS is vast, a shape of the intersection IS is complicated, and an actual running direction of the unmanned vehicle 2 traveling according to the travel course data and a running direction of the unmanned vehicle 2 indicated by the normally lit direction indicator 50 deviate from each other if the direction indicator 50 is normally turned on. That is, the second course type is a course type in which there is a possibility that it is difficult for the driver of the manned vehicle 9 around the unmanned vehicle 2 to sufficiently grasp the running direction of the unmanned vehicle 2. That is, the second course type is a course type in which the actual running direction of the unmanned vehicle 2 and the running direction of the unmanned vehicle 2 indicated by the normally lit direction indicator 50 deviate from each other so that it is difficult for the driver of the manned vehicle 9 around the unmanned vehicle 2 to sufficiently grasp the running direction of the unmanned vehicle 2.

The second course type illustrated in FIG. 5 is a course type in which the intersection IS is connected to each of a travel path HLa, a travel path HLb, a travel path HLc, a travel path HLd, and a travel path HLe. A travel course CR is set to connect the travel path HLa and the travel path HLe. The unmanned vehicle 2 travels toward the travel path HLe after entering the intersection IS from the travel path HLa. Not only the travel path HLe but also the travel path HLc and the travel path HLd exist in front of the unmanned vehicle 2. That is, the travel path HL branches into a plurality of paths in front of the unmanned vehicle 2.

In the case of such a course type, it suffices that the direction indicator 50 is turned on for the right turn when the unmanned vehicle 2 enters the intersection IS from the travel path HLa. On the other hand, when the unmanned vehicle 2 enters the travel path HLe from the intersection IS, there is a possibility that it is difficult for the driver of the manned vehicle 9 to sufficiently grasp whether the unmanned vehicle 2 enters the travel path HLd or the travel path HLe even if the direction indicator 50 is turned on for the left turn.

In addition, when the unmanned vehicle 2 travels toward the travel path HLd after entering the intersection IS from the travel path HLa, there is a possibility that it is difficult for the driver of the manned vehicle 9 to sufficiently grasp whether the unmanned vehicle 2 enters the travel path HLd or the travel path HLc even if the direction indicator 50 is turned on for the right turn.

Figure 6:
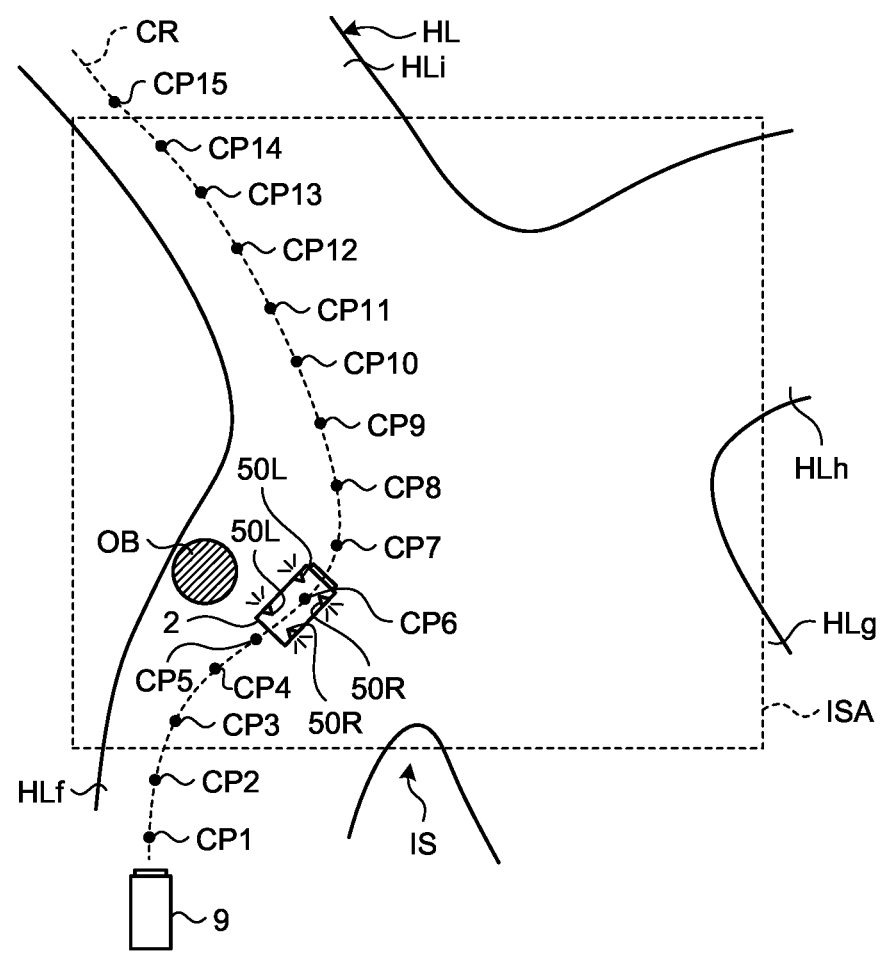
FIG. 6 is a view schematically illustrating an example of the swing area according to the present embodiment.

FIG. 6 is a view schematically illustrating another example of the second course type according to the present embodiment. The second course type illustrated in FIG. 6 is a course type in which the intersection IS is connected to each of a travel path HLf, a travel path HLg, a travel path HLh, and a travel path HLi. A travel course CR is set to connect the travel path HLf and the travel path HLi. The unmanned vehicle 2 travels toward the travel path HLi after entering the intersection IS from the travel path HLf. In addition, there is an obstacle OB near the travel path HLf at the intersection IS. The travel course CR is set to avoid the obstacle OB. That is, the second course type illustrated in the sixth includes the travel course CR that avoids the obstacle OB at the intersection IS. In addition, not only the travel path HLi but also the travel path HLg and the travel path HLh exist in front of the unmanned vehicle 2. That is, the travel path HL branches into a plurality of paths in front of the unmanned vehicle 2.

In the case of such a course type, when the unmanned vehicle 2 moves to the right in order to avoid the obstacle OB, there is a possibility that the driver of the surrounding manned vehicle 9 mistakenly recognizes that the unmanned vehicle 2 enters the travel path HLg or the travel path HLh if the direction indicator 50 is turned on for the right turn.

Note that the second course types illustrated in FIGS. 5 and 6 are examples. The course type data is arbitrarily set by the administrator of the management device 3.

When the intersection IS is the second course type, the course point CP includes the turn signal data for the hazard lighting of the direction indicator 50.

When the intersection IS is the second course type, the turn signal control unit 35 outputs the second command for the hazard lighting of the direction indicator 50 of the unmanned vehicle 2 in the swing area ISA based on the turn signal data. That is, when the unmanned vehicle 2 travels in the intersection IS in the case where the intersection IS is the second course type, the turn signal control unit 35 performs the hazard lighting of the direction indicator 50 as illustrated in FIGS. 5 and 6.

In the second course type, the driver of the manned vehicle 9 around the unmanned vehicle 2 can drive with caution due to the hazard lighting of the direction indicator 50 of the unmanned vehicle 2.

[Management Method]

Figure 7:
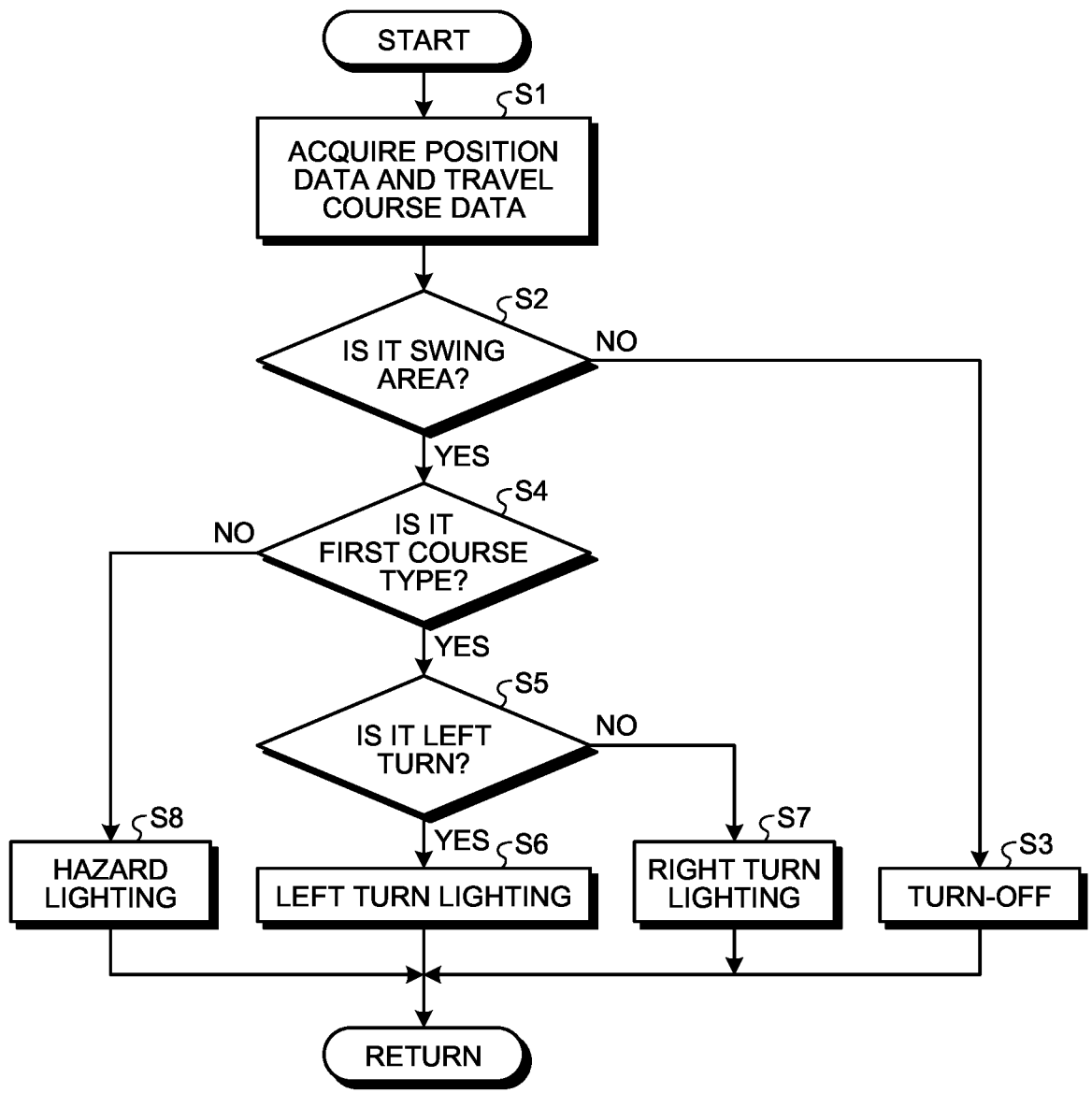
FIG. 7 is a flowchart illustrating an example of a management method according to the present embodiment.

FIG. 7 is a flowchart illustrating an example of a management method according to the present embodiment. The position data acquisition unit 31 acquires position data of the unmanned vehicle 2. The travel course data acquisition unit 32 acquires travel course data (Step S1).

The swing area determination unit 34 determines whether the unmanned vehicle 2 exists in the swing area ISA set at the intersection IS based on the position data and the travel course data of the unmanned vehicle 2 (Step S2).

If it is determined in Step S2 that the unmanned vehicle 2 does not exist in the swing area ISA (Step S2: No), the turn signal control unit 35 does not operate the direction indicator 50. The turn signal control unit 35 turns off the direction indicator 50 (Step S3).

If it is determined in Step S2 that the unmanned vehicle 2 exists in the swing area ISA (Step S2: Yes), the turn signal control unit 35 determines whether the travel course data is the first course type based on a course type of the travel course data (Step S4).

If it is determined in Step S4 that the travel course data is the first course type (Step S4: Yes), the turn signal control unit 35 determines whether to turn on the direction indicator 50 for a left turn based on turn signal data of the travel course data (Step S5).

When it is determined in Step S5 that the direction indicator 50 is turned on for the left turn (Step S5: Yes), the turn signal control unit 35 outputs the first command to turn on only the left turn signal lamp 50L of the direction indicator 50 for the left turn. As a result, the unmanned vehicle 2 turns left at the intersection IS while performing the left turn lighting (Step S6).

When it is determined in Step S5 that the direction indicator 50 is not turned on for the left turn (Step S5: No), the turn signal control unit 35 outputs the first command to turn on only the right turn signal lamp 50R of the direction indicator 50 for the right turn. As a result, the unmanned vehicle 2 turns right at the intersection IS while performing the right turn lighting (Step S7).

If it is determined in Step S4 that the travel course data is not the first course type (Step S4: No), the turn signal control unit 35 outputs the second command for the hazard lighting of the direction indicator 50 based on the turn signal data of the travel course data. As a result, the unmanned vehicle 2 travels in the intersection IS with the hazard lighting (Step S8).

[Computer System]

Figure 8:
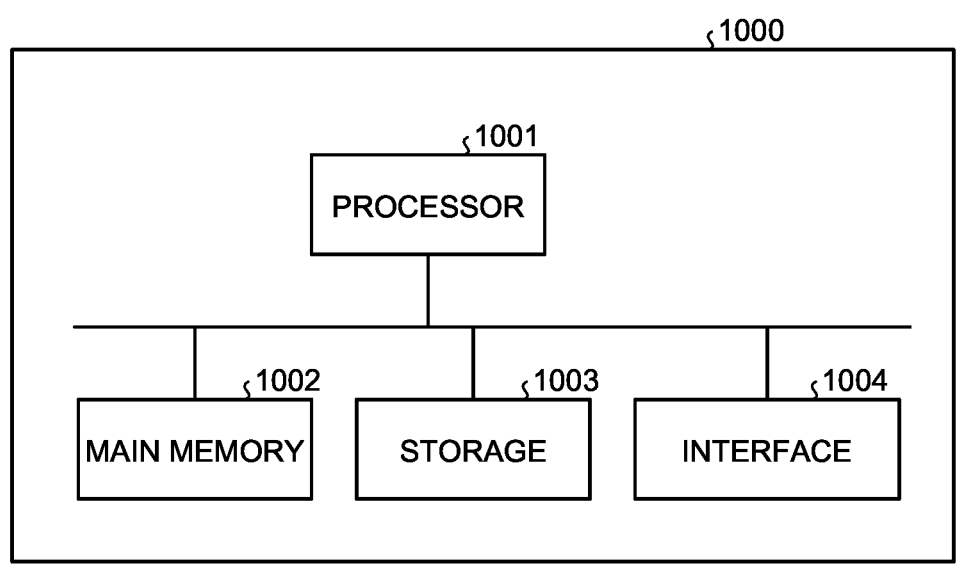
FIG. 8 is a block diagram illustrating an example of a computer system according to the present embodiment.

FIG. 8 is a block diagram illustrating an example of a computer system 1000 according to the present embodiment. Each of the management device 3, the control device 30, and the control device 40 described above includes the computer system 1000. The computer system 1000 includes: a processor 1001 such as a central processing unit (CPU); a main memory 1002 including a nonvolatile memory such as a read only memory (ROM) and a volatile memory such as a random access memory (RAM); a storage 1003; and an interface 1004 including an input/output circuit. The respective functions of the management device 3, the control device 30, and the control device 40 described above are stored in the storage 1003 as programs. The processor 1001 reads the program from the storage 1003, expands the read program in the main memory 1002, and executes the above-described processing according to the program. Note that the program may be delivered to the computer system 1000 via a network.

The program can execute acquisition of terrain data of a work site on which the unmanned vehicle 2 travels and determination on whether the direction indicator 50 of the unmanned vehicle 2 is normally operated or is non-normally operated based on the terrain data according to the above embodiment.

Effect

As described above, it is determined whether the direction indicator 50 of the unmanned vehicle 2 is normally operated or is non-normally operated based on the travel course data according to the present embodiment. The normal operation includes the left turn lighting or the right turn lighting, and the non-normal operation includes the hazard lighting. Since the direction indicator 50 of the unmanned vehicle 2 operates normally or non-normally based on the travel course data, the driver of the manned vehicle 9 can drive with caution without being confused. Therefore, the driver of the manned vehicle 9 can be made to grasp the running direction of the unmanned vehicle 2.

According to the present embodiment, whether the travel course data is the first course type or the second course type is determined when the unmanned vehicle 2 enters the swing area ISA set at the intersection IS. The direction indicator 50 is turned on for the left turn or for the right turn, which is the normal operation, at the swing area ISA in the first course type, and the direction indicator 50 is turned on for the hazard, which is the non-normal operation, at the swing area ISA in the second course type. The intersection ISA of the second course type is the intersection ISA in which the actual running direction of the unmanned vehicle 2 and the running direction of the unmanned vehicle 2 indicated by the direction indicator 50 deviate from each other if the direction indicator 50 normally operates. If the direction indicator 50 normally operates at the intersection ISA of the second course type, there is a possibility that the driver of the manned vehicle 9 around the unmanned vehicle 2 fails to sufficiently grasp the running direction of the unmanned vehicle 2 and becomes confused. It is determined whether the direction indicator 50 of the unmanned vehicle 2 is normally operated or is non-normally operated based on the travel course data in the present embodiment. When the unmanned vehicle 2 travels in the intersection IS of the second course type, the direction indicator 50 is turned on for the hazard which is the non-normal operation. As a result, the driver of the manned vehicle 9 can drive with caution without being confused. Therefore, the driver of the manned vehicle 9 can be made to grasp the running direction of the unmanned vehicle 2. Therefore, the safety of the work site is improved, and a decrease in work efficiency of the work site is suppressed.

Other Embodiments

In the above embodiment, the hazard lighting of the direction indicator 50 is performed when the second command is output from the turn signal control unit 35. The hazard lighting is not necessarily performed as long as an operating state can be distinguished from the normal operation by the driver of the manned vehicle 9. An emergency operation may include, for example, alternately turning on the left turn signal lamp 50L and the right turn signal lamp 50R.

In the above embodiment, the hazard lighting of the direction indicator 50 is performed when the second command is output from the turn signal control unit 35. For example, when the unmanned vehicle 2 is equipped with a warning sound output device that outputs a warning sound, the turn signal control unit 35 may output the second command to the warning sound output device to notify the driver of the manned vehicle 9 of an emergency. As a warning is output from the warning sound output device based on the second command, the driver of the manned vehicle 9 can drive with caution. In addition, when the unmanned vehicle 2 is equipped with a lamp device that can emit light, the turn signal control unit 35 may output the second command to the lamp device to notify the driver of the manned vehicle 9 of an emergency. As light is emitted from the lamp device based on the second command, the driver of the manned vehicle 9 can drive with caution.

In the above embodiment, the hazard lighting is performed when the travel course data is the second course type. The hazard lighting may be performed when the management system 1 detects an error, for example, when the administrator mistakenly sets the target travel direction of the course point CP or forgets the setting itself.

In the above embodiment, the unmanned vehicle 2 travels according to the travel course data. The unmanned vehicle 2 may travel according to map data of the work site where coordinates are defined. In addition, the turn signal control unit 35 determines whether to normally operate or non-normally operate the direction indicator 50 of the unmanned vehicle 2 based on the travel course data in the above embodiment. The turn signal control unit 35 may determine whether to normally operate or non-normally operate the direction indicator 50 of the unmanned vehicle 2 based on the map data of the work site where the coordinates are defined. Each of the travel course data and the map data defines terrain data of the work site in which the unmanned vehicle 2 travels. In this case, the terrain data acquisition unit includes a map data acquisition unit that acquires the map data. In addition, the terrain data includes the first command and the second command which are operation attribute signals indicating a type of lighting or blinking operation of the direction indicator 50.

As another embodiment, an operation attribute signal which is the first command for the normal operation of the direction indicator 50 or the second command for the non-normal operation may be transmitted as the travel course data transmitted from the management device 3 to the control device 30. The turn signal control unit 35 may control the direction indicator 50 based on the first command or the second command transmitted from the management device 3. When the control device 30 receives a command different from the first command or the second command, for example, a command for stopping or deactivating the operation of the direction indicator 50, the operation of the direction indicator 50 is stopped or deactivated.

In the above embodiment, at least some of the functions of the control device 30 and the functions of the control device 40 may be provided in the management device 3, and at least some of the functions of the management device 3 may be provided in the control device 30 and the control device 40.

Note that the travel course data is generated in the management device 3, and the unmanned vehicle 2 travels according to the travel course data transmitted from the management device 3 in the above embodiment. The control device 30 of the unmanned vehicle 2 may generate the travel course data. That is, the control device 30 may have the travel course data generation unit 3A. In addition, each of the management device 3 and the control device 30 may have the travel course data generation unit 3A.

Note that the unmanned vehicle 2 is the dump truck which is a kind of transport vehicle in the above embodiment. The unmanned vehicle 2 may be a wheel-type work machine such as a wheel loader and a motor grader.

Note that the travel course data may be used in combination with the operation attribute signal, the turn signal data, the course type data, and the terrain data as necessary, or may be combined with any one of them in the above embodiment.

REFERENCE SIGNS LIST

1 MANAGEMENT SYSTEM
2 UNMANNED VEHICLE
3 MANAGEMENT DEVICE
3A TRAVEL COURSE DATA GENERATION UNIT
3B SWING AREA SETTING UNIT
4 COMMUNICATION SYSTEM
5 CONTROL FACILITY
6 WIRELESS COMMUNICATION DEVICE

7 LOADER
8 CRUSHER
9 MANNED VEHICLE
21 TRAVELING DEVICE
22 VEHICLE MAIN BODY
23 DUMP BODY
24 DRIVE DEVICE
25 BRAKE DEVICE
26 STEERING DEVICE
27 WHEEL
27F FRONT WHEEL
27R REAR WHEEL
28 POSITION DETECTION DEVICE
29 WIRELESS COMMUNICATION DEVICE
50 DIRECTION INDICATOR
30 CONTROL DEVICE
31 POSITION DATA ACQUISITION UNIT
32 TRAVEL COURSE DATA ACQUISITION UNIT (TERRAIN DATA ACQUISITION UNIT)
33 OPERATION CONTROL UNIT
34 SWING AREA DETERMINATION UNIT
35 TURN SIGNAL CONTROL UNIT
40 CONTROL DEVICE
CP COURSE POINT
CR TRAVEL COURSE
PA WORK SITE
DPA DISCHARGING SITE
HL TRAVEL PATH
IS INTERSECTION

The invention claimed is:

1. A work site management system comprising:
a left turn signal lamp and a right turn signal lamp on an unmanned vehicle;
a travel course data acquisition unit that acquires travel course data of the unmanned vehicle which includes course type data indicating a type of an intersection at a work site where the unmanned vehicle travels; and
a turn signal control unit that determines whether to normally operate or non-normally operate a direction indicator of the unmanned vehicle based on the course type data,
the turn signal control unit outputs a first command for normally operating the direction indicator of the unmanned vehicle when the course type data is a first course type, and outputs a second command different from the first command to the unmanned vehicle when the course type data is a second course type,
wherein normally operate is a left turn lighting command when the unmanned vehicle is turning left and a right turn lighting command when the unmanned vehicle is turning right,
wherein non-normally operate is a hazard command for a hazard lighting which is the simultaneous lighting of both the left turn signal lamp and the right turn signal lamp, and
wherein the course type data includes the first course type in which a running direction of a right turn or a left turn at the intersection is clear, and the second course type in which an actual running direction of the unmanned vehicle and a running direction of the unmanned vehicle indicated by the direction indicator deviate from each other.

2. The work site management system according to claim 1, wherein
the second course type includes an operation of avoiding an obstacle at the intersection.

3. A work site management method comprising:
providing a left turn signal lamp and a right turn signal lamp on an unmanned vehicle;
acquiring travel course data of an unmanned vehicle which includes course type data indicating a type of an intersection at a work site where the unmanned vehicle travels;
determining whether to normally operate or non-normally operate a direction indicator of the unmanned vehicle based on the course type data, and
outputting a first command for normally operating the direction indicator of the unmanned vehicle when the course type data is a first course type, and outputting a second command different from the first command to the unmanned vehicle when the course type data is a second course type,
wherein normally operate is a left turn lighting command when the unmanned vehicle is turning left and a right turn lighting command when the unmanned vehicle is turning right,
wherein non-normally operate is a hazard command for a hazard lighting which is the simultaneous lighting of both the left turn signal lamp and the right turn signal lamp,
wherein the course type data includes the first course type in which a running direction of a right turn or a left turn at the intersection is clear, and the second course type in which an actual running direction of the unmanned vehicle and a running direction of the unmanned vehicle indicated by the direction indicator deviate from each other.

* * * * *